(12) United States Patent
Hutchison et al.

(10) Patent No.: US 9,940,067 B2
(45) Date of Patent: *Apr. 10, 2018

(54) PERFORMING A DATA WRITE ON A STORAGE DEVICE

(71) Applicant: International Business Machines Corporation, Armonk, NY (US)

(72) Inventors: Gordon D. Hutchison, Eastleigh (GB); Cameron J. McAllister, Eastleigh (GB); Lucy A. Harris, Southampton (GB); Bruce J. Smith, Emsworth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,065

(22) Filed: Aug. 16, 2016

(65) Prior Publication Data

US 2016/0357444 A1   Dec. 8, 2016

Related U.S. Application Data

(63) Continuation of application No. 14/515,513, filed on Oct. 15, 2014, now Pat. No. 9,448,891, which is a (Continued)

(30) Foreign Application Priority Data

Oct. 30, 2008 (EP) .................................. 08167942
Oct. 30, 2008 (EP) .................................. 08167943

(51) Int. Cl.
*G06F 3/06* (2006.01)
*G06F 11/14* (2006.01)
*G06F 17/30* (2006.01)

(52) U.S. Cl.
CPC .............. *G06F 3/065* (2013.01); *G06F 3/067* (2013.01); *G06F 3/0619* (2013.01);
(Continued)

(58) Field of Classification Search
None
See application file for complete search history.

(56) References Cited

U.S. PATENT DOCUMENTS 6,397,227 B1   5/2002   Klein et al.
6,769,074 B2   7/2004   Vaitzblit
(Continued)

FOREIGN PATENT DOCUMENTS

CN   101030178 A   9/2007
CN   101105737 A   1/2008
(Continued)

OTHER PUBLICATIONS

IBM, "Reverse FlashCopy relationships", IBM Knowledge Center, D58870 7.2.0.>IBM DS8000 Series V7.2> Product overview>Technical overview>Copy Services>FlashCopy>Reverse FlashCopy relationships, 2 pages http://www-01.ibm.com/support/knowledgecenter/HW213_7.2.0/com.ibm.storage.ssic.help.doc/f2c_fcreverse_1m7m11.html.
(Continued)

*Primary Examiner* — Midys Rojas
(74) *Attorney, Agent, or Firm* — Peter J. Edwards

(57) ABSTRACT

A method of performing a data write on a storage device comprises instructing a device driver for the device to perform a write to the storage device, registering the device driver as a transaction participant with a transaction co-ordinator, executing a flashcopy of the storage device, performing the write on the storage device, and performing a two-phase commit between device driver and transaction co-ordinator. Preferably, the method comprises receiving an
(Continued)

instruction to perform a rollback, and reversing the data write according to the flashcopy. In a further refinement, a method of scheduling a flashcopy of a storage device comprises receiving an instruction to perform a flashcopy, ascertaining the current transaction in relation to the device, registering the device driver for the device as a transaction participant in the current transaction with a transaction co-ordinator, receiving a transaction complete indication from the co-ordinator, and executing the flashcopy for the device.

10 Claims, 8 Drawing Sheets

Related U.S. Application Data continuation of application No. 13/462,654, filed on May 2, 2012, now Pat. No. 8,904,130, which is a continuation of application No. 13/125,027, filed as application No. PCT/EP2009/064086 on Oct. 26, 2009, now Pat. No. 8,904,127, said application No. 14/515,513 is a continuation of application No. 13/125,027, filed on Apr. 19, 2011, now Pat. No. 8,904,127.

(52) U.S. Cl.
CPC ...... *G06F 11/1435* (2013.01); *G06F 11/1458* (2013.01); *G06F 11/1469* (2013.01); *G06F 11/1471* (2013.01); *G06F 11/1474* (2013.01); *G06F 17/30088* (2013.01); *G06F 11/1466* (2013.01); *G06F 2201/84* (2013.01)

(56) References Cited

U.S. PATENT DOCUMENTS

| | | |
|---|---|---|
| 6,996,586 B2 | 2/2006 | Stanley et al. |
| 7,043,507 B2 | 5/2006 | Lanzatella et al. |
| 7,461,100 B2 | 12/2008 | Spear et al. |
| 2002/0174033 A1 | 11/2002 | Lin |
| 2004/0260897 A1 | 12/2004 | Sanchez et al. |
| 2005/0273518 A1 | 12/2005 | Patrick et al. |
| 2005/0278391 A1 | 12/2005 | Spear et al. |
| 2007/0072163 A1 | 3/2007 | Groff et al. |
| 2007/0136328 A1 | 6/2007 | Carro |
| 2007/0255763 A1 | 11/2007 | Beyerle et al. |
| 2007/0300013 A1 | 12/2007 | Kitamura |
| 2009/0024851 A1 | 1/2009 | Andrade |
| 2009/0138549 A1 | 5/2009 | Huang et al. |
| 2010/0115218 A1 | 5/2010 | Hutchison et al. |
| 2011/0219192 A1 | 9/2011 | Hutchison et al. |
| 2012/0278559 A1 | 11/2012 | Hutchison et al. |
| 2013/0124920 A1 | 5/2013 | Adir et al. |
| 2015/0033069 A1 | 1/2015 | Hutchison et al. |

FOREIGN PATENT DOCUMENTS

| | | | |
|---|---|---|---|
| JP | 2005339554 A | | 12/2005 |
| JP | 2006527873 A | | 12/2006 |
| JP | 2007501456 A | | 1/2007 |
| JP | 2008004090 A | | 1/2008 |
| JP | 2008536202 A | | 9/2008 |
| TW | 507148 B | | 10/2002 |
| TW | 1234095 B | | 6/2005 |
| TW | 200826069 A | | 6/2008 |
| WO | 2006096339 A2 | | 9/2006 |
| WO | 2007130698 A2 | | 11/2007 |
| WO | 2010049391 A2 | | 5/2010 |

OTHER PUBLICATIONS

International Search Report and Written Opinion dated May 4, 2010 for Application No. PCT/EP2009/064086 filed Oct. 26, 2009.
Chinese Office Action dated Jan. 30, 2013 for Serial No. 200980143073.3 filed Oct. 26, 2009.
Background Art cited in Chinese Office Action dated Jan. 30, 2013 for Serial No. 200980143073.3 filed Oct. 26, 2009.
English translation of JP2007501456 published Jan. 25, 2007.
English translation of CN101030178A published Sep. 5, 2007.
English translation of CN1011105737 A published Jan. 16, 2008.
English translation of JP2005339554A published Dec. 8, 2005.
English translation of JP2006527873A published Dec. 7, 2006.
English translation of JP2008004090A published Jan. 10, 2008.
English translation of JP2008536202A published Sep. 4, 2008.
Information Material for IDS for JP Office Action dated Jul. 16, 2013 for Serial No. 2011-533698 filed Oct. 26, 2009.
Information Material for IDS for TIPO Office Action dated Feb. 20, 2014 for Serial No. 98133282 filed Sep. 30, 2009.
Prelim Amendment filed Apr. 19, 2011. pp. 1-8. for U.S. Appl. No. 13/125,027, filed Apr. 19, 2011 by inventors G.D. Hutchison, et al. (18.388).
2nd Prelim Amendment dated May 2, 2012, pp. 1-6, for U.S. Appl. No. 13/125,027, filed Apr. 19, 2011 by inventors G.D. Hutchison, et al. (18.388).
Office Action dated Mar. 22, 2013, pp. 1-31, for U.S. Appl. No. 13/125,027, filed Apr. 19, 2011 by inventors G.D. Hutchison, et al. (18.388).
Response dated Jun. 18, 2013. pp. 1-14. to Office Action dated Mar. 22, 2013. pp. 1-31. for U.S. Appl. No. 13/125,027, filed Apr. 19, 2011 by inventors G.D. Hutchison, et al. (18.388).
Final Office Action dated Aug. 22, 2013, pp. 25, for U.S. Appl. No. 13/125,027, filed Apr. 19, 2011 by inventors G.D. Hutchison, et al. (18.388).
Response dated Oct. 22, 2013, pp. 10, to Final Office Action dated Aug. 22, 2013, pp. 25, for U.S. Appl. No. 13/125,027, filed Apr. 19, 2011, (18.388).
Advisory Action dated Nov. 5, 2013, pp. 12, for U.S. Appl. No. 13/125,027, filed Apr. 19, 2011, (18.388).
Response dated Dec. 13, 2013, pp. 10, to Advisory Action dated Nov. 5, 2013, pp. 12, for U.S. Appl. No. 13/125,027, filed Apr. 19, 2011, (18.388).
Office Action dated Jan. 16, 2014, pp. 15, for U.S. Appl. No. 13/125,027, filed Apr. 19, 2011 (18.388).
Response dated Apr. 16, 2014, pp. 9, to Office Action dated Jan. 16, 2014, pp. 15, for U.S. Appl. No. 13/125,027, filed Apr. 19, 2011 (18.388).
Final Office Action dated May 7, 2014, pp. 14, for U.S. Appl. No. 13/125,027, filed Apr. 19, 2011 by inventors G.D. Hutchison, et al. (18.388).
Response dated Jul. 7, 2014, pp. 8, to Final Office Action dated May 7, 2014, pp. 14, for U.S. Appl. No. 13/125,027, filed Apr. 19, 2011 by inventors G.D. Hutchison, et al. (18.388).
Notice of Allowance dated Jul. 17, 2014, pp. 15, for U.S. Appl. No. 13/125,027, filed Apr. 19, 2011 (18.388).
Prelim Amendment filed May 2, 2012, pp. 1-6, for U.S. Appl. No. 13/462,654, filed May 2, 2012 by inventors G.D. Hutchison, et al. (18.388C1).
Office Action dated Mar. 22, 2013, pp. 1-22, for U.S. Appl. No. 13/462,654, filed May 2, 2012 by inventors G.D. Hutchison, et al. (18.388C1).
Response dated Jun. 18, 2013, pp. 1-14, to Office Action dated Mar. 22, 2013, pp. 1-22, for U.S. Appl. No. 13/462,654, filed May 2, 2012 by inventors G.D. Hutchison, et al. (18.388C1).
Final Office Action dated Aug. 16, 2013, pp. 19, for U.S. Appl. No. 13/462,654, filed May 2, 2012 by inventors G.D. Hutchison, et al. (18.388C1).
Response dated Oct. 16, 2013, pp. 8, to Final Office Action dated Aug. 16, 2013, pp. 19, for U.S. Appl. No. 13/462,654, filed May 2, 2012, (18.388C1).
Advisory Action dated Nov. 5, 2013, pp. 12, for U.S. Appl. No. 13/462,654, filed May 2, 2012, (18.388C1).

(56) References Cited

OTHER PUBLICATIONS

Response dated Dec. 13, 2013, pp. 8, to Advisory Action dated Nov. 5, 2013, pp. 12, for U.S. Appl. No. 13/462,654, filed May 2, 2012, (18.388C1).
Office Action dated Jan. 15, 2014, pp. 15, for U.S. Appl. No. 13/462,654, filed May 2, 2012 (18.388C1).
Response dated Apr. 15, 2014, pp. 3, to Office Action dated Jan. 158, 2014, pp. 15, for U.S. Appl. No. 13/462,654, filed May 2, 2012 (18.388C1).
Final Office Action dated May 7, 2014, pp. 14, for U.S. Appl. No. 13/462,654, filed May 2, 2012 by inventors G.D. Hutchison, et al. (18.388C1).
Response dated Jul. 7, 2014, pp. 6, Final Office Action dated May 7, 2014, pp. 14, for U.S. Appl. No. 13/462,654, filed May 2, 2012 by inventors G.D. Hutchison, et al. (18.388C1).
Notice of Allowance dated Jul. 17, 2014, pp. 15, for U.S. Appl. No. 13/462,654, filed May 2, 2012 (18.388C1).

PERFORMING A DATA WRITE ON A STORAGE DEVICE

BACKGROUND

This invention relates to a method of, and system for, performing a data write on a storage device. The invention, in one embodiment, provides a mechanism to allow storage subsystems to take part in transactional rollbacks.

The storage of data in large organisations is of fundamental importance, both for reliability of the data and for the ability to recover data in the event of any hardware failure. Storage area network (SAN) is an architecture that is used when very large amounts of data are needed to be stored in a reliable and secure manner. This technology allows networks to be created that support the attachment of remote computer storage devices such as disk arrays to servers in such a way that, to the operating system, the devices appear as locally attached. It is common in these networks to include a large amount of redundancy, both in the data storage and in the hardware connections between the individual components.

Various methods exist for creating data redundancy. For example, a function such as the flashcopy function enables an administrator to make point-in-time, full volume copies of data, with the copies immediately available for read or write access. The flashcopy can be used with standard backup tools that are available in your environment to create backup copies on tape. Flashcopy creates a copy of a source volume on a target volume. This copy is called a point-in-time copy.

When a flashcopy operation is initiated, a relationship is created between a source volume and target volume. This relationship is a "mapping" of the source volume and the target volume. This mapping allows a point-in-time copy of that source volume to be copied to the associated target volume. The relationship exists between this volume pair, from the time that the flashcopy operation is initiated, until the storage unit copies all data from the source volume to the target volume or the relationship is deleted.

When the data is physically copied, a background process copies tracks from the source volume to the target volume. The amount of time that it takes to complete the background copy depends on the following criteria, the amount of data being copied, the number of background copy processes that are occurring and any other activities that are presently occurring.

In storage, the user can create a flashcopy that takes a point-in-time back up of some storage disks. If the user subsequently has a problem with their storage they can reverse the flashcopy to restore the saved version of the data. The direction of the flashcopy relationship can be reversed, where the volume that was previously defined as the target becomes the source for the volume that was previously defined as the source (and is now the target). The data that has changed is copied to the volume previously defined as the source.

An administrator can reverse a flashcopy relationship if they wish to restore a source volume (volume A) to a point in time before they originally performed the flashcopy operation. In effect, they are reversing the flashcopy operation so that it appears as though no flashcopy operation ever happened. The background copy process of a flashcopy operation must complete before it is possible to reverse volume A as the source and volume B as the target.

There will be certain circumstances when it is desired to reverse an original flashcopy relationship. For example, there may be created a flashcopy relationship between source volume A and target volume B, and then data loss occurs on source volume A. It is possible to reverse the flashcopy relationship so that volume B is copied to volume A.

Unfortunately, there are a number of disadvantages with this method of operating the data storage. For example, using the flashcopy function, it is straightforward to restore back to a point-in-time at which the flashcopy was taken, but this is not always the right time, in the context of the data recovery that is attempting to be performed. Similarly, when the copies are taken as a function of a clock time, as a background task, rather than based on what is going on in the system, the actual point-in-time may not be of any use relative to the data recovery. Even continuous data protection is not automated and has no notion of when is the sensible time to take backups. Additionally, copies tend to be large and include many sets of disks due to the nature of many interleaved systems being in play and the need to have them all cross-consistent. This creates a large processing and storage burden. Systems have to be quiesced and flushed in a monolithic manner. In most flashcopy scenarios the applications are stopped and the device drivers flushed of cache data prior to the flashcopy. This will flush all application data to the storage device, in order to create a clean image of the vdisk that is being flashcopied and may include data that was cached for other vdisks and applications that are not involved in the flashcopy.

Additionally, when a user creates a point in time backup copy, using flashcopy, of a virtual disk they are trying to fulfil the business requirement of taking a backup copy of a whole set of business data (that is stored on the disk) as it is at a particular point in time. There is a problem in doing this as there are many layers of caching, including possibly, for example, in the application and web-server middleware, in the database, in the file system and in the multipathing device driver. The current approach to taking a flashcopy of a set of business data is to stop all the application and middleware work that is using the storage disk and (typically) to shut down the associated middleware servers, forcing it to store all the data into the disk. This disk can then be flashcopied to create a consistent set of business data that can be backed up.

This is a problem if a user wishes to take a point-in-time copy of the business data, but does not wish to stop or shut down the applications or application server. As there is the desire to take a consistent set of data this means that the user does not wish to take a flashcopy of the data part way through a unit of work but as these units of work occur very rapidly and these all start and stop at "machine speed" it would be impossible to press a button, or indeed to start a flashcopy at exactly the point in time when an application has reached a consistent business state.

It is therefore an object of the invention to improve upon the known art.

SUMMARY

According to a first aspect of the present invention, there is provided a method of performing a data write on a storage device comprising instructing a device driver for the storage device to perform a data write to the storage device, registering the device driver as a transaction participant with a transaction co-ordinator, executing a flashcopy of the storage device, performing the data write on the storage device, and performing a two-phase commit between the device driver and the transaction co-ordinator.

According to a second aspect of the present invention, there is provided a system for performing a data write on a storage device comprising a file system arranged to instruct a device driver for the storage device to perform a data write to the storage device, a transaction co-ordinator arranged to register the device driver as a transaction participant, a storage device, and a device driver for the storage device, arranged to execute a flashcopy of the storage device, to perform the data write on the storage device, and to perform a two-phase commit with the transaction co-ordinator.

According to a third aspect of the present invention, there is provided a computer program product on a computer readable medium for operating a device driver for a storage device, the product comprising instructions for, following receipt of an instruction to perform a data write to the storage device, registering the device driver as a transaction participant with a transaction co-ordinator, executing a flashcopy of the storage device, performing the data write on the storage device, and performing a two-phase commit with the transaction co-ordinator.

According to a fourth aspect of the present invention, there is provided a method of scheduling a flashcopy of a storage device comprising receiving an instruction to perform a flashcopy on a storage device, ascertaining the current transaction in relation to the storage device, registering the device driver for the storage device as a transaction participant in the current transaction with a transaction co-ordinator, receiving a transaction complete indication from the transaction co-ordinator, and executing the flashcopy for the storage device.

According to a fifth aspect of the present invention, there is provided a system for scheduling a flashcopy of a storage device comprising a transaction co-ordinator, a storage device, and a device driver for the storage device, and arranged to receive an instruction to perform a flashcopy on a storage device, to ascertain the current transaction in relation to the storage device, to register as a transaction participant in the current transaction with the transaction co-ordinator, to receive a transaction complete indication from the transaction co-ordinator, and to initiate the flashcopy for the storage device.

According to a sixth aspect of the present invention, there is provided a computer program product on a computer readable medium for scheduling a flashcopy of a storage device, the product comprising instructions for receiving an instruction to perform a flashcopy on a storage device, ascertaining the current transaction in relation to the storage device, registering the device driver for the storage device as a transaction participant in the current transaction with a transaction co-ordinator, receiving a transaction complete indication from the transaction co-ordinator, and executing the flashcopy for the storage device.

Owing to the invention, it is possible to provide a method by which data integrity can be maintained on storage devices that are connected into a transactional system such as a storage area network. The invention provides an effective and efficient method by which data can be restored if a transaction (which includes a data write) should fail, without requiring undue processing or storage loads.

This invention, in one embodiment, is a mechanism that allows, for marked storage volumes, the multipathing/device driver software that is used for controller volumes to become a transaction participant under middleware coordination, for example using DB2 or WEBSPHERE. This invention allows for a network storage disk to become a transactional file service, in which a transaction rollback will restore all the data written to the storage system to be rolled back to how it was at the start of the transaction. The device driver can take part in the transaction. If the device driver is told of a transaction start on a particular thread, then the driver can note all access to the storage disks that that thread updates. The driver can tell the storage controller about the transaction which will create a reversible flashcopy with a timestamp prior to the execution of the first data write.

On a prepare if desired it can flush any cache to disk, but this does not now have to be all data, a monolithic flush as is the case today, it can be just for blocks that were updated as part of this transaction. The system does not have to be quiesed. This invention now allows the flushing through of just data that was involved in the transaction that includes data that is being written to the vdisk(s) being flashcopied and other data that is not involved in the transaction can remain in the cache. This is because the device driver and application server can continue to accept new work for other transactions during the operation of this invention, as each transaction's cache data can be flushed independently, there is no need to flush all of the data thus nor to wait until all units of work are stopped in order to be able to do this. The transaction protocol can be tunneled in the data traffic metadata that is sent between the driver and the storage controller. Suitable configuration options in the file system allow the user to set the vdisks and transaction co-ordination that they desire.

A flashcopy can be incremental, whereby only data that has changed since the last time the flashcopy was triggered is copied across (or back). This is the most efficient form of operating the flashcopy. There is also no need for a background copy process as only grains 'split' by an application write (during the transaction) will ever have to be copied back and never other parts of the dataset that would be transferred into the destination by the background copy process.

Preferably the method further comprises, after receiving an instruction to perform a rollback, and reversing the data write according to the flashcopy. On any rollback sent, the device driver can switch the direction of the flashcopy to restore the datasets to the contents they had at the beginning of the transaction. After receiving an instruction to commit the transaction, the device driver can discard the flashcopy. On transaction completion the flashcopy can be discarded.

Advantageously, the step of performing the data write on the storage device immediately follows the initiation of the flashcopy of the storage device. This ensures that the flashcopy taken from the storage device is taken at a point-in-time that immediately precedes the actually action of writing to the storage volume. This will ensure that during any possible future rollback, the use of the flashcopy will return the data stored on the storage device to its original state, just prior to the beginning of the data write.

Ideally, the step of registering the device driver as a transaction participant with the transaction co-ordinator is carried out by the device driver. The preferred embodiment is for the device driver itself to register with the transaction co-ordinator. This has the advantage of simplifying the process of ensuring that the device driver is registered as a transaction participant for the right transaction.

Owing to the invention, it is further possible to provide system that can now automatically align a flashcopy with a point of consistent data and deal with host cache flushing without having to stop any applications from running. The core invention provided by the method and system allows for a better solution to having to stop all the IO to the storage vdisks and flush the hosts' caches manually, and then create a flashcopy. The invention is essentially that the system will no longer actually issue a flashcopy at the exact point when it is requested but instead make the flash copy at the point the vdisk(s) in question are next at a point of consistency as defined by the transactional activity of the application.

In this method of timing the flashcopy, the system sets the flashcopy prepare/take as before, but when the user issues the command to take the flashcopy, the device driver that is handling IO to the vdisk notices the current transaction that the IO is occurring under.

Instead of the flashcopy occurring immediately it will occur at the next transaction boundary. With this invention, when the device driver is told of the pending flashcopy request for the vdisk, it registers as a participant in the current transaction. When the transaction completion two phase commit protocol sends a 'prepare' message to the device driver, it makes sure that it flushes all local caching (if any) to the storage controller. All other participants in the transaction, for example a web-application server/database etc., will be doing the same thing and they also will issue the equivalent of a 'flush' for data they wish to harden. The 'order' of prepares being sent to transaction participants is not defined, but once the device driver receives a prepare for this transaction its cache will go into write through for this transaction so all writes will flow to the server.

Therefore all writes to the storage disk will flow through the device driver and not be cached. When the device driver receives the transaction completion indication, it will send (via a tunnelled protocol on the fibre channel cable) a notification to the system that the flashcopy can actually start at that point in time, as the transaction has completed the data on the disk and no further IO has yet been allowed to the disk. This will have the advantages of aligning the flashcopy time to an actual point in time that is relevant to the point of consistency of business applications and a transaction boundary, and provides the ability to take a useful flashcopy without having to stop the front end application.

The invention can be implemented in the following steps. Step 1, a flashcopy is created with a new flag ("flashcopy to use transaction boundaries"). Step 2, the flashcopy is prepared, step 3 the flashcopy is 'started' (this does not start flashcopy for real) device driver(s) that is/are creating IO for the vdisks (since the previous flashcopy) are informed of the pending transactional flashcopy. At step 4 the device driver looks to see if there is a current transaction. If not, then it continues as normal. If so, then it registers as a participant in the current transaction and continues to service IO but awaits for transaction completion with 2 phase commit. When the device driver receives a prepare, if it has received IO for the vdisk in question, the device driver flushes all/any cache and any further \\'Tites go into write through to the storage controller when it receives a commit (OR rollback OR if a user specified time-out is reached) the device driver will indicate to the storage controller (down fibre channel) to actually take the flashcopy at that point in time.

The storage controller does not take the flashcopy straight away but tells the device driver that one is pending, the device driver will then reply to the storage controller when it gets the next commit point at the end of the current transaction (as the data will then be consistent) to tell the storage controller to take the flashcopy start from that point in time. If there are multiple transactions 'in-flight' to the disks involved, then the device driver can send the notification when the last one in that set completes. If an IO to the same disk appears at the device driver that is done under a completely new transaction during the time between the registration on a previous transaction and its completion, then the IO for that transaction can be (at the user's discretion) delayed until the transactions that were in-flight at the time the flashcopy was initiated are completed. Otherwise a series of always overlapping transactions could delay the flashcopy starting indefinitely or force the flashcopy to start at a point at which the data present on the disk is not a fully consistent set of business data.

BRIEF DESCRIPTION OF THE DRAWINGS

Embodiments of the present invention will now be described, by way of example only, with reference to the accompanying drawings, in which.

Figure 1:
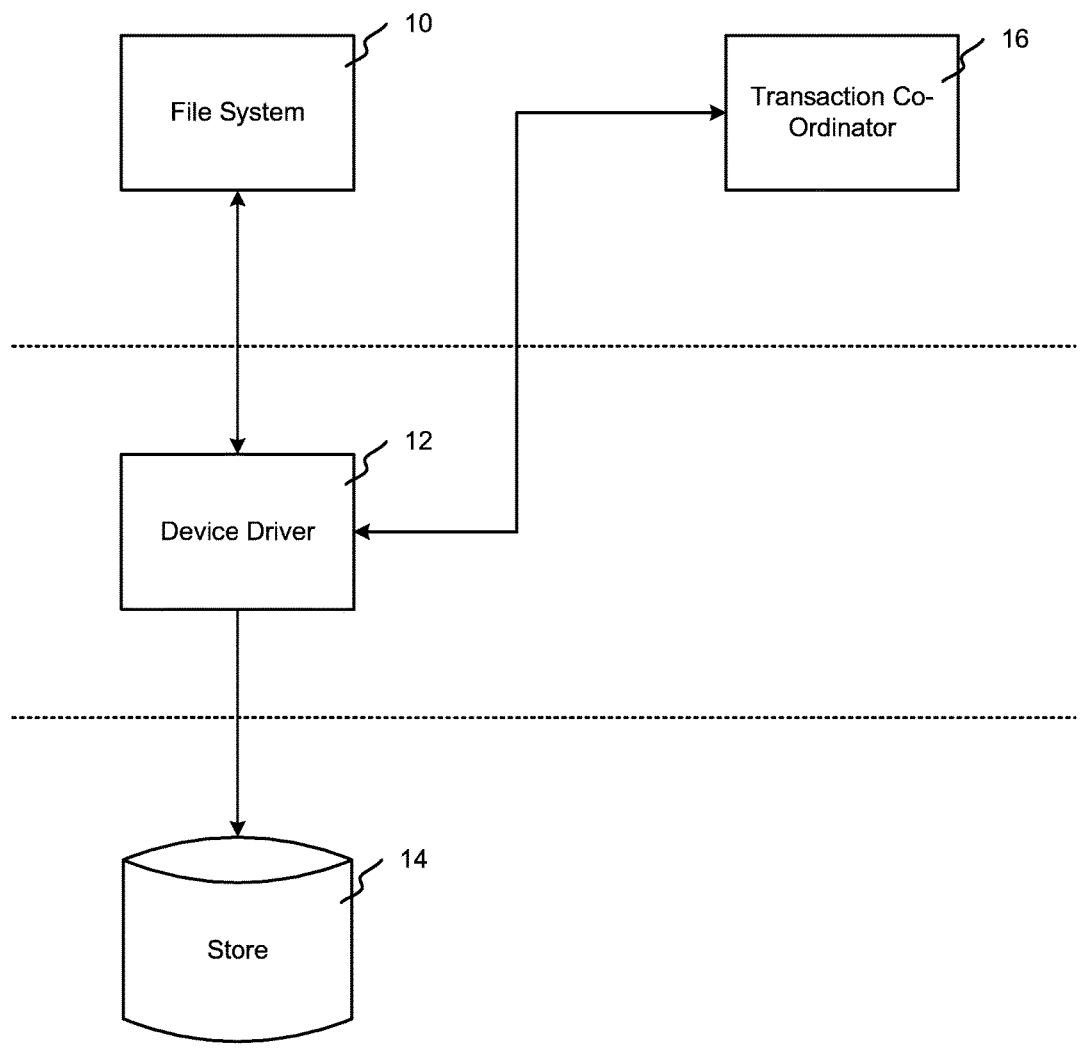
FIG. 1 is a schematic diagram of a system for performing a data write on a storage device.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Schematically illustrated in FIG. 1 is a system for performing data writes. A file system 10 communicates with a device driver 12, which is a driver 12 that is specific to a storage device 14. The device driver 12 is also in communication with a transaction co-ordinator 16. The file system 10 and the transaction co-ordinator 16 are software components that are located on one or more servers that comprise a storage area network (SAN) along with the storage device 14. In a practical embodiment of the invention, there will be a large number of servers and storage devices interconnected together to form the overall network. The device driver 12 may be a purely software component or may be comprised of a software component and a physical layer.

The software components of the file system 10 and the transaction co-ordinator 16 have application interfaces to external applications that are also being run within the storage area network. For example, the network may be managing an organisation's commercial website that is receiving orders for goods to be purchased, and the storage device 14 is storing customer orders as they are made via the website. In this case, an application is being run within the network, which has a user interface through the website to receive orders and then take the necessary actions, such as creating an order for storage by the device 14. The application will interact with the file system 10 in order to perform the task of writing the data to the storage device 14.

The transaction co-ordinator 16 is a software component that ensures that any actions taken within the network conform to a desired level of transaction processing. Transaction processing is designed to maintain a computer system such as the network being discussed, in a known, consistent state, by ensuring that any operations carried out on the system, that are interdependent, are either all completed successfully or all cancelled successfully. Each unit of work within the network is handled through the transaction co-ordinator 16, which ensures that consistency of each unit of work. Transaction processing protects against hardware and software errors, which might leave a transaction partially completed, with the network left in an unknown, inconsistent state. If the network (or any component or connection within it) fails in the middle of a transaction, the transaction co-ordinator 16 guarantees that all operations in any uncommitted (i.e., not completely processed) transactions are cancelled.

Figure 2:
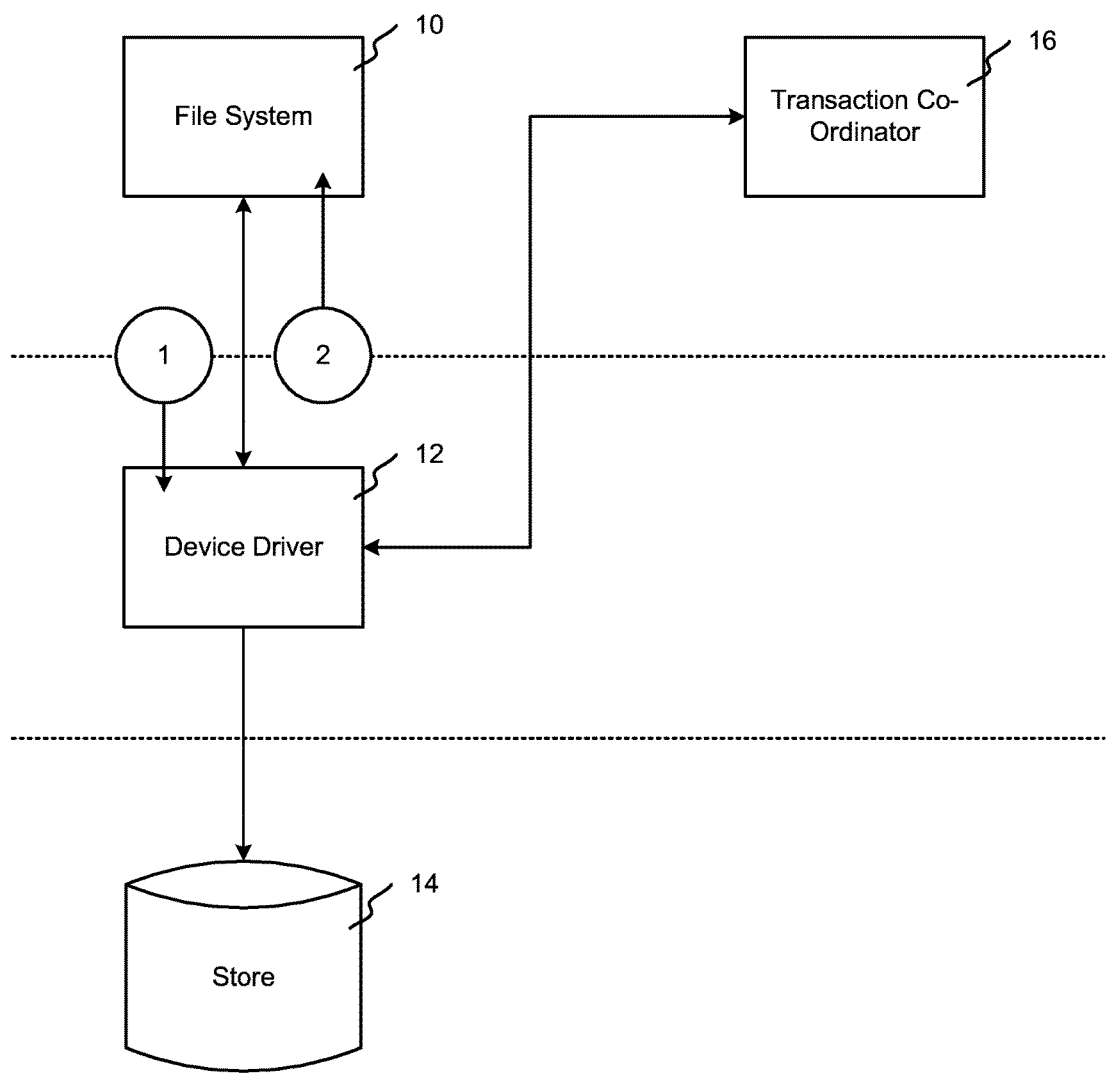
FIG. 2 is a further schematic diagram of a system for performing a data write on a storage device.

FIG. 2 shows the system of FIG. 1 following the triggering of some unit of work within the network that requires data to be written to the storage device 14. As discussed above, this will be the result of some action taken by an application that is running within the network, such as an end user making a purchase on a website that is being managed by the enterprise system that the network is maintaining. As a result, a user order needs to be stored in the database 14 that stores the information relating to that order.

The first action (1) is that the file system 10 will instruct the device driver 12 for the storage device 14 to perform the data write to the storage device 14. In response to this, the second action (2) is for the device driver 12 to be registered as a transaction participant with the transaction co-ordinator 16. This action (2) is shown as being taken by the device driver 12 itself, but in fact the registration of the device driver 12 with the transaction co-ordinator 16 may be executed by a different component within the system, such as the file system 10.

The purpose of this registration is that the device driver 12 now becomes a participant in a transaction processing system, with all the attendant requirements that this entails. The device driver 12 is now part of a system in which the actions that it takes, with respect to the data write, must be confirmed with the transaction co-ordinator 16, and forms part of a larger transaction, within the meaning of transaction processing.

Figure 3:
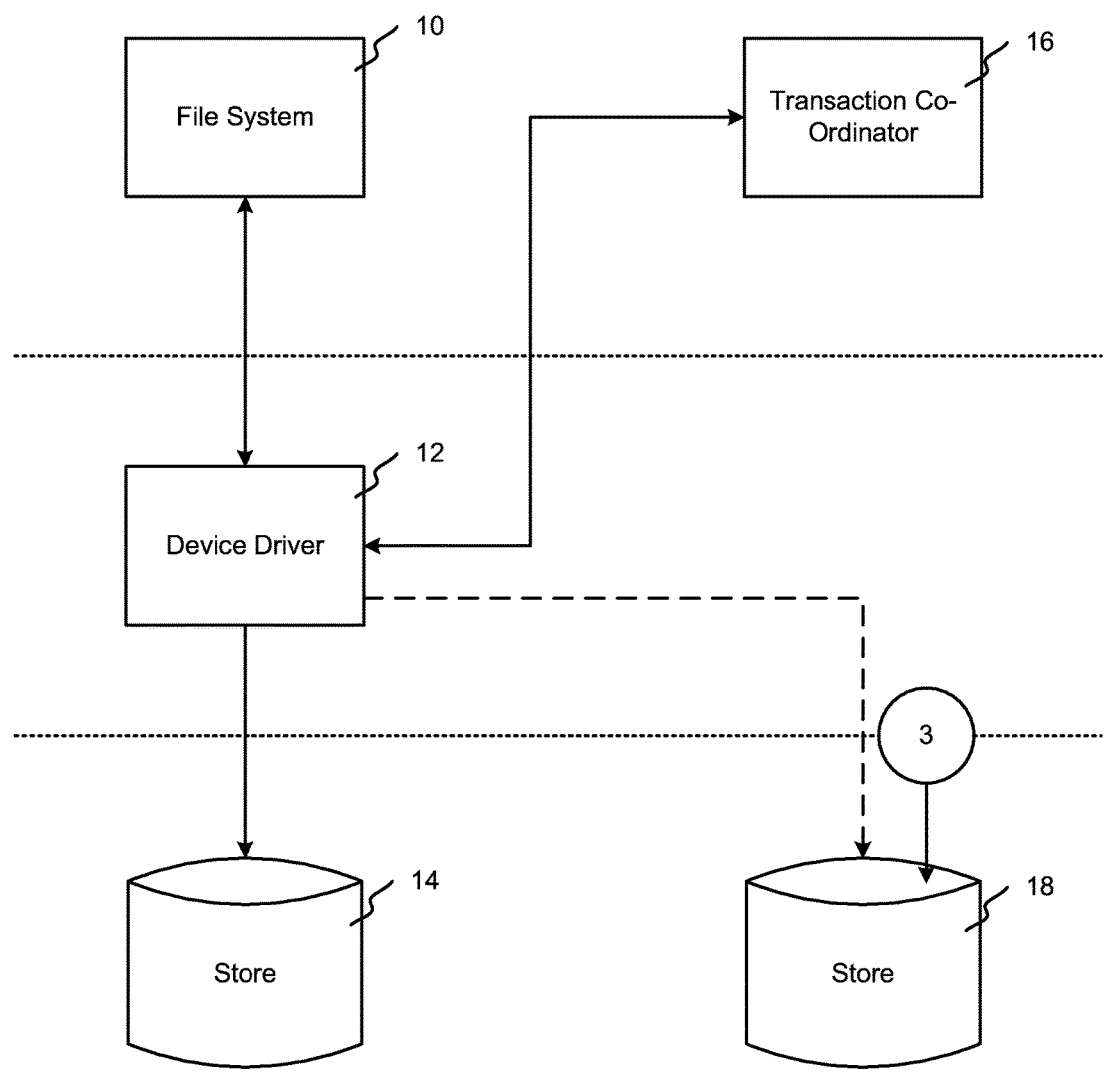
FIG. 3 is a further schematic diagram of a system for performing a data write on a storage device.

The next stage of the processing of the data write is shown in FIG. 3, which is where the device driver 12 is arranged, after it has been registered with the transaction co-ordinator 16, to execute a flashcopy of the storage device 14. This action is shown as the action (3) in the Figure, and results in the volume of the storage device 14 being replicated at a new storage location 18, which may be a different piece of hardware or simply a new logical location within the overall network. The nature of the flashcopy function is that a copy of the data stored in the device 14 has now been made for a specific point-in-time. The flashcopy function creates a background task that will copy the data stored by the storage device 14 to the new volume 18 at a rate determined according to the bandwidth available. In addition any changes to the data in the storage device 14 or requests for data from the new volume 18 cause an automatic copying of the data from the storage device 14 to the new storage location 18.

The device driver 12 is initiating the flashcopy of the content of the storage device 14 before any writing to that device 14 is made. Indeed, it is advantageous for the device driver to move straight to the performance of the data write, without any intermediate actions, in order to ensure that the copy held in the new location 18 is a copy of the data exactly as it was before the new data write is performed. Effectively, the device driver 12 is preparing a recovery copy of the data stored by the storage device 14, in preparation for any failure in the transaction, of which the specific data write forms a part.

Figure 4:
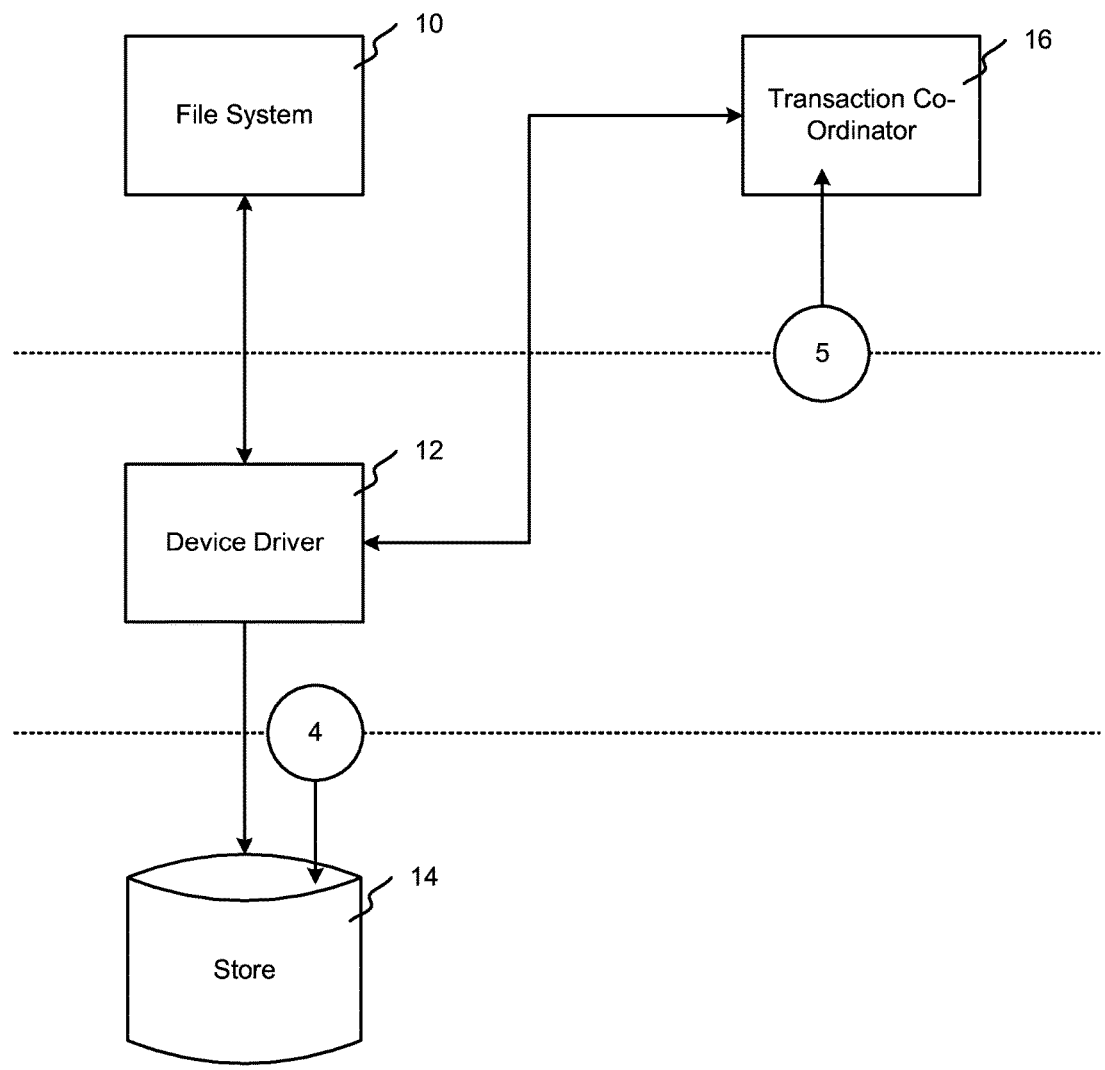
FIG. 4 is a further schematic diagram of a system for performing a data write on a storage device.

The final two actions of the processing of the data write are shown in FIG. 4, which comprises the action (4) of performing the data write on the storage device 14, and the action (5) of performing a two-phase commit between the device driver 12 and the transaction co-ordinator 16. The first of these two actions (4) is a conventional data write from the device driver 12 to the storage device 14. This will also trigger the copying of the overwritten data in the storage device 14 to the new location 18 of FIG. 3, under the control of the flashcopy function, if that data has not already been copied across by the background task.

The second of the two actions, the action (5) of performing a two-phase commit between the device driver 12 and the transaction co-ordinator 16 is a requirement of the device driver 12 being registered as a transaction participant with the transaction co-ordinator 16, in action (2), detailed above with respect to FIG. 2. This action is shown as a bi-directional communication between the two components 12 and 16. The two-phase commit is required for each acting component in the current unit of work that includes the data write to the storage device 14.

The two-phase commit protocol is a distributed algorithm that ensures that all of the components in the distributed network agree to commit a transaction, before it is completed. The protocol results in either all components committing the transaction or all components aborting the transaction. The two phases of the algorithm are firstly, the commit-request phase, in which the transaction coordinator 16 prepares the participating components, and the commit phase, in which the transaction coordinator 16 completes the transactions.

The effect of the two-phase commit on the device driver 12 is that the driver 12 has to issue an agreement message or an abort message to the transaction coordinator 16, in dependence upon whether the data write of action (4) was completed successfully or not. In addition, the device driver 12 has to wait for a commit or rollback message from the transaction coordinator 16 to complete the two-phase commit process. If the device driver 12 is instructed to rollback the data write, then the device driver 12 has access to the flashcopy of the original data that has been overwritten, in order to perform the rollback correctly.

Figure 5:
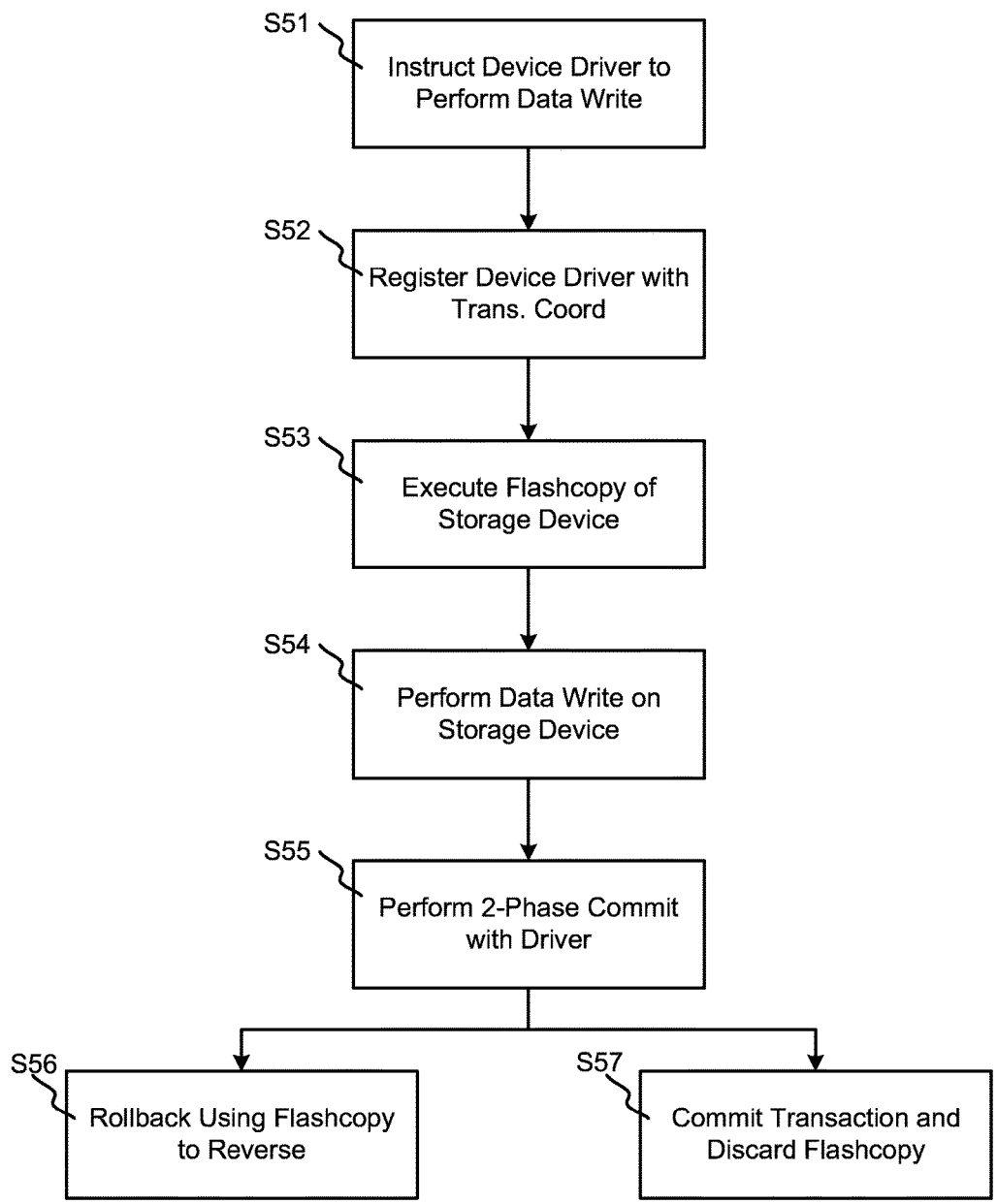
FIG. 5 is a flowchart of the method of performing the data write on the storage device.

The process illustrated in FIGS. 2 to 4 is summarised in the flowchart of FIG. 5. The method of performing the data write on the storage device 14 comprises, firstly, as step S51, instructing the device driver 12 for the storage device 14 to perform a data write to the storage device 14. Once this is completed, then the second step is the step S52 of registering the device driver 12 as a transaction participant with the transaction co-ordinator 16. Once the device driver 12 is registered, then the next step is the step S53 of executing a flashcopy of the storage device 14. Once the flashcopy has been initiated, then this is followed by the step S54 of performing the data write on the storage device 14, and the there is performed at step S55, the step of performing the two-phase commit between the device driver 12 and the transaction co-ordinator 16.

The two possible outcomes of the two-phase commit process are represented by the two mutually exclusive steps S56 and S57. The first of these possibilities is step S56, which comprises receiving an instruction to perform a rollback, and reversing the data write according to the flashcopy. The second of these possibilities is step S57, which comprises receiving an instruction to commit the transaction, and discarding the flashcopy. The principal advantage of the first steps S51 to S55, as described above with reference to FIGS. 2 to 4, is that in the event of a rollback, which is either caused by the device driver voting no in the two-phase commit or the transaction co-ordinator 16 instructing a rollback (after a different participant voting no), then the flashcopy can be used to reconstruct the data on the storage device 14. The flashcopy has caused a point-in-time copy of the data stored by the device 14 to be copied to a second location 18, and this can be reversed, to effectively undo the data write. If there is a decision to commit the transaction that comprises the current unit of work, then the flashcopy can be discarded.

Figure 6:
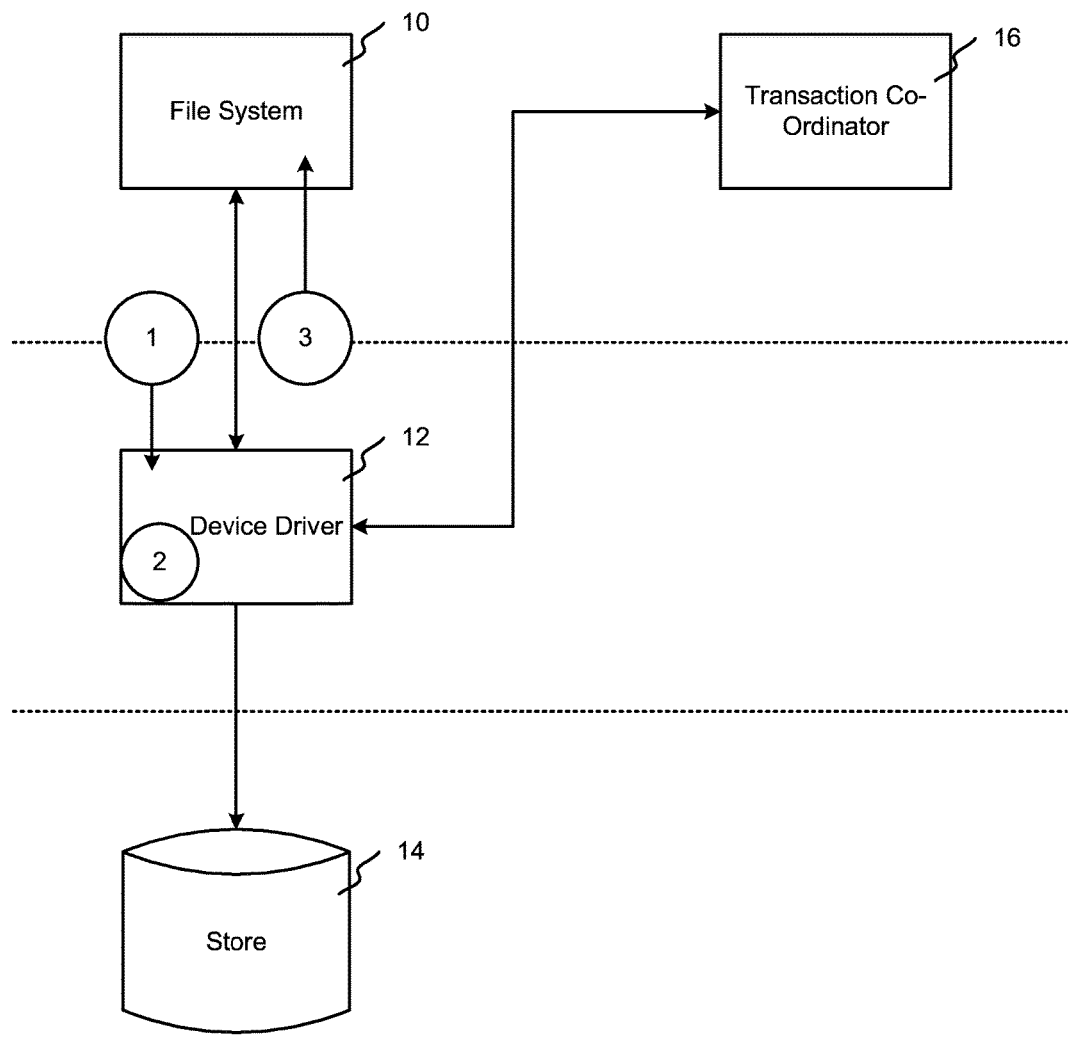
FIG. 6 is a further schematic diagram of a system for performing a data write on a storage device, showing various system actions according to a further refinement of the preferred embodiment.

FIG. 6 shows the system of FIG. 1 according to a further refinement of the preferred embodiment, wherein an instruction is received (shown as action 1 in the Figure) to perform a flashcopy of the storage device 14. This flashcopy instruction may have been generated automatically by an application, or may have been generated by a user, such as a system administrator. A point in time copy of the data held by the storage device 14 is requested. In a conventional system, a flashcopy of the storage volume defined by the storage device 14 would now have been taken. However, the system shown in FIG. 6 operates in an adapted manner, whenever a flashcopy (backup) instruction is received, regardless of the source of the instruction.

Following the receipt of the instruction (1), the device driver will ascertain the current transaction in relation to the storage device 14. This action is shown as (2) in the Figure. In response to this, the third action (3) is for the device driver 12 to be registered as a transaction participant with the transaction co-ordinator 16, in respect of the current transaction, identified at (2). This action (3) is shown as being taken by the device driver 12 itself, but in fact the registration of the device driver 12 with the transaction co-ordinator 16 may be executed by a different component within the system, such as the file system 10. The purpose of this registration is that the device driver 12 now becomes a participant in a transaction processing system, with all the attendant requirements that this entails. The device driver 12 is now part of a system in which the actions that it takes, with respect to the data write, must be confirmed with the transaction co-ordinator 16, and forms part of a larger transaction, within the meaning of transaction processing.

Figure 7:
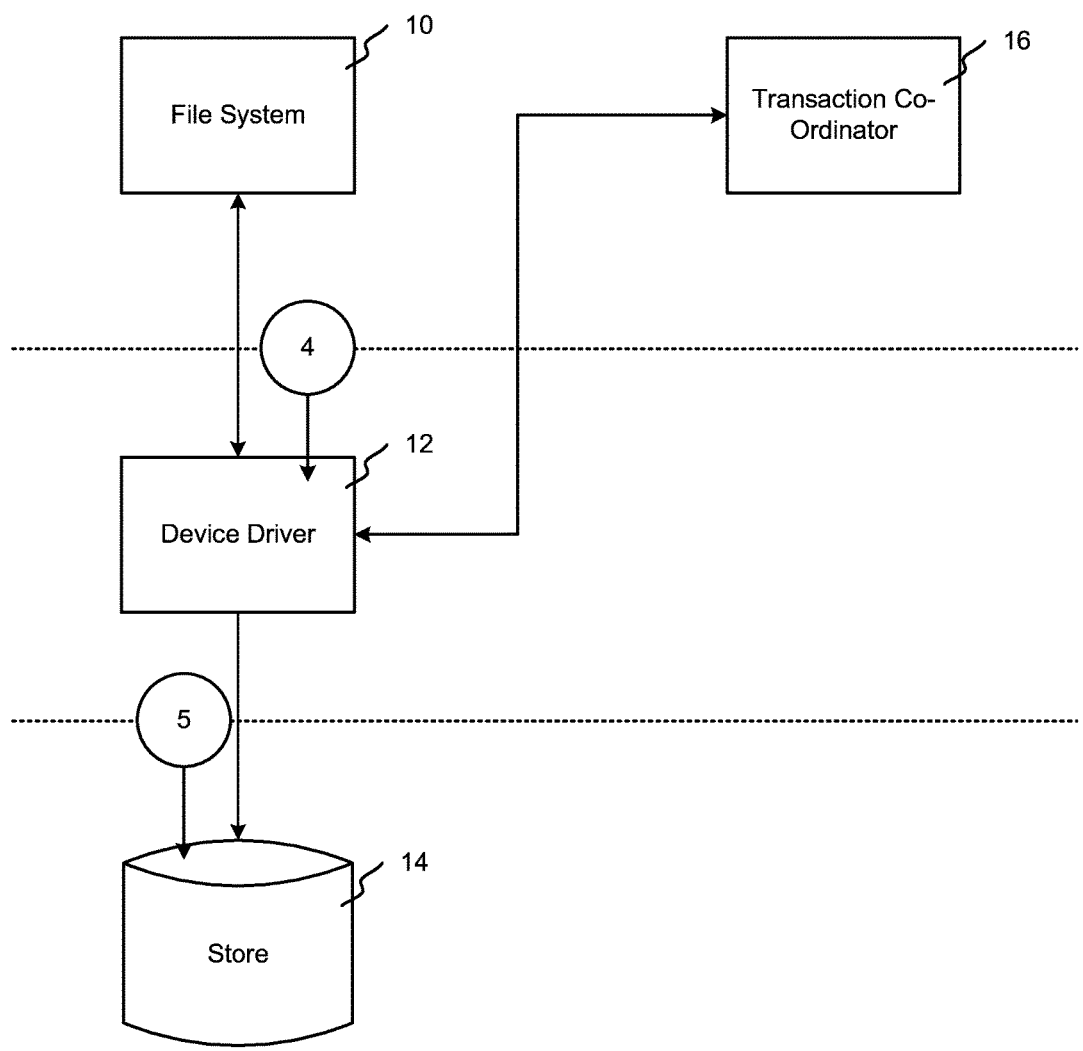
FIG. 7 is a further schematic diagram of a system for performing a data write on a storage device, showing various system actions according to a further refinement of the preferred embodiment.

The next stage of the scheduling of the flashcopy is shown in FIG. 7, which is where the device driver 12 is arranged, after it has been registered with the transaction co-ordinator 16, to receive a transaction complete indication (4) from the transaction co-ordinator 16.

Effectively, the device driver 12 is pausing from initiating the execution of the flashcopy immediately that it is instructed, until the device driver 12 has registered itself in relation to the current transaction, with the transaction manager 16, and then received the indication (4) from the transaction manager 16 that the current transaction has been completed and that therefore the data on the storage device 14 is now in a consistent state.

After the indication (4) has been received, then the next action executed by the device driver 12 is the action (5) of initiating the execution of the flashcopy of the storage device 14. This action is shown as the action (5) in FIG. 7, and results in the volume of the storage device 14 being replicated at a new storage location 18, which may be a different piece of hardware or simply a new logical location within the overall network. The nature of the flashcopy function is that a copy of the data stored in the device 14 has now been made for a specific point-in-time. The flashcopy function creates a background task that will copy the data stored by the storage device 14 to the new volume 18 at a rate determined according to the bandwidth available. In addition, any changes to the data in the storage device 14 or requests for data from the new volume 18 cause an automatic copying of the data from the storage device 14 to the new storage location 18.

The device driver 12 is initiating the flashcopy of the content of the storage device 14 while the storage device 14 is in a consistent state. Indeed, it is advantageous for the device driver 12 to move straight to the initiation of the flashcopy, without any intermediate actions, in order to ensure that the copy held in the new location 18 is a replica of the data held by the storage device 14 as close to the original point in time at which the flashcopy instruction was received.

The processing includes the performing of a two-phase commit between the device driver 12 and the transaction co-ordinator 16, which is a requirement of the device driver 12 being registered as a transaction participant with the transaction co-ordinator 16, in action (3), detailed above with respect to FIG. 6. This action is a bi-directional communication between the two components 12 and 16. The two-phase commit is required for each acting component in the current transaction.

The two-phase commit protocol is a distributed algorithm that ensures that all of the components in the distributed network agree to commit a transaction, before it is completed. The protocol results in either all components committing the transaction or all components aborting the transaction. The two phases of the algorithm are firstly, the commit-request (prepare) phase, in which the transaction coordinator 16 prepares the participating components, and the commit phase, in which the transaction coordinator 16 completes the transactions.

The effect of the two-phase commit on the device driver 12 is that the driver 12 has to issue an agreement message or an abort message to the transaction coordinator 16. In addition, the device driver 12 has to wait for a commit or rollback message from the transaction coordinator 16 to complete the two-phase commit process. If the device driver 12 is instructed to rollback, then the device driver 12 has access to the flashcopy of the original data that has been overwritten, in order to perform the rollback correctly. If two-phase commit is being used, then prior to receiving a transaction complete indication from the transaction co-ordinator, there is received a prepare message and this leads to the flushing of all local cache.

Figure 8:
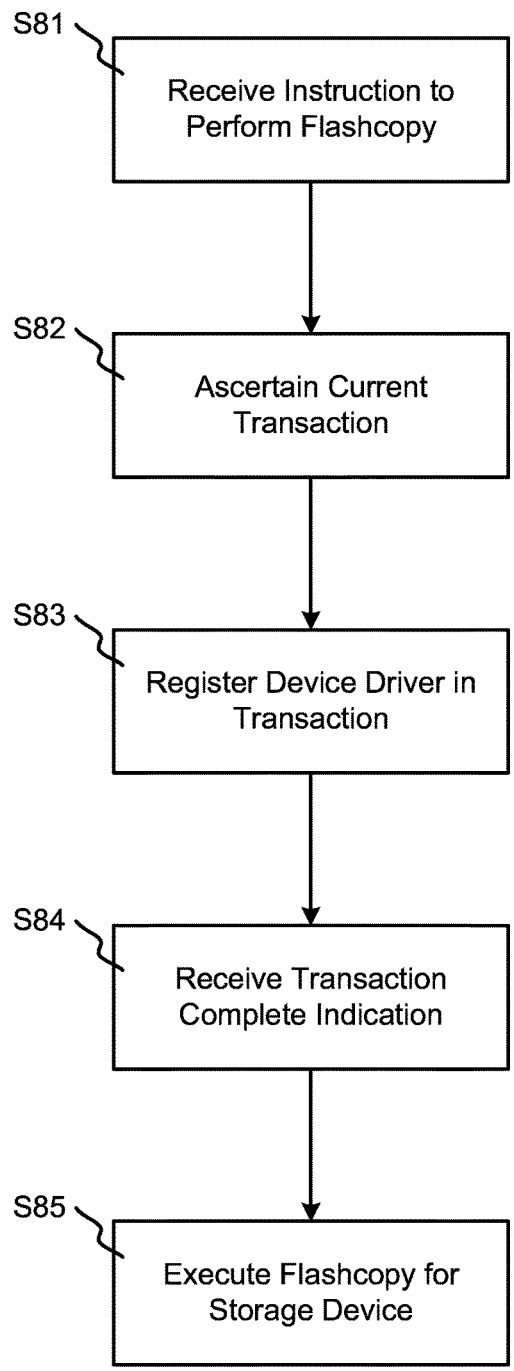
FIG. 8 is a flowchart of a method of scheduling a flashcopy of the storage device according to a further refinement of the preferred embodiment.

The method of scheduling the flashcopy according to a further refinement of the preferred embodiment is summarised in FIG. 8. The first step S81, is the step of receiving an instruction to perform the flashcopy on the storage device 14, which is followed by step S82, in which the device driver 12 ascertains the current transaction in relation to the storage device 14. Once this has been done, then at step S83, the device driver 12 (for the storage device 14) registers as a transaction participant in the current transaction with the transaction co-ordinator 16. This now hooks the device driver into the current transaction being performed with respect to the storage device 14. Once the current transaction has been completed, then at step S84 there is received a transaction complete indication, at the device driver 12, from the transaction co-ordinator 16, and the method is completed by the step S85 which comprises executing the flashcopy for the storage device 14. This execution is initiated by the device driver 12 and carried out by the storage controller.

What is claimed is:

1. A method of performing a data write on a storage device comprising:
   instructing a device driver for the storage device to perform a data write to the storage device, wherein the data write is part of a current transaction;
   registering the device driver as a transaction participant with a transaction co-ordinator;
   executing a flashcopy of the storage device;
   performing the data write on the storage device; and
   performing a two-phase commit between the device driver and the transaction co-ordinator, the two-phase commit comprising:
      a prepare phase, comprising an instruction to the device driver to prepare for the transaction; and
      a commit phase, comprising an agreement message from the device driver to the transaction co-ordinator.

2. The method according to claim 1, and further comprising receiving an instruction to perform a rollback, and reversing the data write according to the flashcopy.

3. The method according to claim 1, and further comprising receiving an instruction to commit the transaction, and discarding the flashcopy.

4. The method according to claim 1, wherein the performing the data write on the storage device immediately follows the initiation of the flashcopy of the storage device.

5. The method according to claim 1, wherein the registering the device driver as a transaction participant with the transaction co-ordinator is carried out by the device driver.

6. A system for performing a data write on a storage device comprising:
   a file system arranged to instruct a device driver for the storage device to perform a data write to the storage device, wherein the data write is part of a current transaction;
   a transaction co-ordinator arranged to register the device driver as a transaction participant;
   a storage device; and
   a device driver for the storage device, arranged to execute a flashcopy of the storage device, to perform the data write on the storage device, and to perform a two-phase commit with the transaction co-ordinator, the two-phase commit comprising:
      a prepare phase, comprising an instruction to the device driver to prepare for the transaction; and
      a commit phase, comprising an agreement message from the device driver to the transaction co-ordinator.

7. The system according to claim 6, wherein the device driver is further arranged to receive an instruction to perform a rollback, and to reverse the data write according to the flashcopy.

8. The system according to claim 6, wherein the device driver is further arranged to receive an instruction to commit the transaction, and to discard the flashcopy.

9. The system according to claim 6, wherein the device driver is further arranged to perform the data write on the storage device, immediately following the initiation of the flashcopy of the storage device.

10. The system according to claim 6, wherein the device driver is further arranged to register the device driver as a transaction participant with the transaction co-ordinator.

* * * * *